(12) United States Patent
Berto

(10) Patent No.: US 6,748,977 B2
(45) Date of Patent: Jun. 15, 2004

(54) VALVE

(75) Inventor: Lucio Berto, Vigonza (IT)

(73) Assignee: Dunridge Limited, County Galway (IE)

( * ) Notice: Subject to any disclaimer, the term of this patent is extended or adjusted under 35 U.S.C. 154(b) by 27 days.

(21) Appl. No.: 10/169,536

(22) PCT Filed: Dec. 21, 2000

(86) PCT No.: PCT/IE00/00166
§ 371 (c)(1),
(2), (4) Date: Jun. 28, 2002

(87) PCT Pub. No.: WO01/50046
PCT Pub. Date: Jul. 12, 2001

(65) Prior Publication Data
US 2002/0189693 A1 Dec. 19, 2002

(30) Foreign Application Priority Data
Dec. 30, 1999 (IT) ......................................... PD99A0296

(51) Int. Cl.[7] .......................... F16K 11/20; F16K 31/04
(52) U.S. Cl. ................... 137/628; 138/66; 138/630.19; 251/129.19
(58) Field of Search ..................... 137/66, 628, 630.19, 137/613, 614.11, 637, 637.2; 251/129.15, 129.19

(56) References Cited

U.S. PATENT DOCUMENTS

| | | | |
|---|---|---|---|
| 2,268,960 A | | 1/1942 | Ray |
| 2,850,030 A | | 9/1958 | Guelson |
| 2,873,069 A | | 2/1959 | Matthews |
| 2,899,970 A | * | 8/1959 | Matthews ..................... 137/66 |
| 6,047,718 A | * | 4/2000 | Konsky et al. ................ 137/1 |

FOREIGN PATENT DOCUMENTS

EP    0 875 720 A    11/1998

OTHER PUBLICATIONS

International Preliminary Examination Report for the corresponding PCT application PCT/IE00/00166; Jan. 2002.*

* cited by examiner

Primary Examiner—John Rivell
Assistant Examiner—Ramesh Krishnamurthy
(74) Attorney, Agent, or Firm—Sughrue Mion, PLLC

(57) ABSTRACT

A valve (1) for supplying fuel gas to a gas appliance comprises a valve housing (2) having a valve chamber (3) extending therethrough. Fuel gas is supplied through an inlet port (5) to the valve chamber (3) and from main and secondary outlet ports (6,7) to a burner and a pilot light jet, respectively, of the gas appliance. A primary valving member (35) and a secondary valving member (36) co-operate with a primary valve seat (15) and a secondary valve seat (20), respectively, for isolating the main and secondary outlet ports (6,7) from the inlet port (5). A main carrier member (30) carries the primary valving member (35) and is magnetically coupled to a first secondary carrier member (31) which is driven by a stepper motor (38). A second secondary carrier member (32) is magnetically coupled to the main carrier member (30) for carrying the secondary valving member (36). Electromagnetic coils (60,61) magnetically couple the first and second secondary carrier members (31,32) to the main carrier (30) so that the drive motor (38) can operate the main carrier (30) and in turn the primary and secondary valving members (35,36) for opening and closing primary and secondary communicating passageways (19,25) through the primary and secondary valve seats (15,20). Isolating the coils (60,61) from a power supply causes the first and second carrier members (31,32) to be decoupled from the main carrier (30), and first compression springs (65,66) urge the primary valving member (35) into engagement with the primary valve seat (15) while a second compression spring (80) urges the secondary valving member (36) into engagement with the secondary valve seat (20) the outlet ports (6,7) from the inlet port (5).

20 Claims, 5 Drawing Sheets

VALVE

Figure 1:
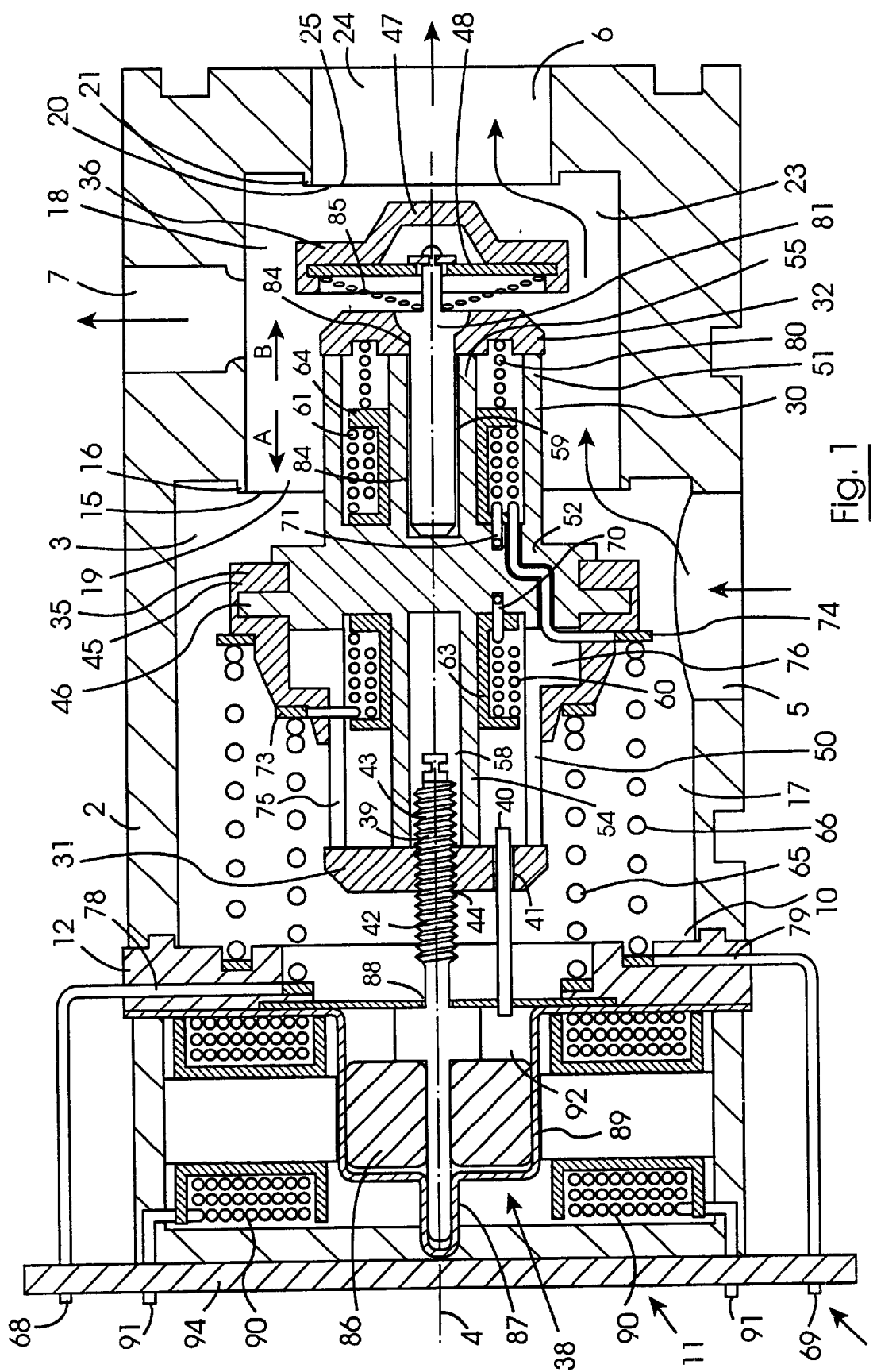

This is a National stage entry under 35 U.S.C. §371 of Application No. PCT/IE00/00166 filed Dec. 21, 2000; the disclosure of which is incorporated herein by reference.

BACKGROUND OF THE INVENTION

The present invention relates to a valve, and in particular, to a safety valve which is particularly suitable though not limited to use as a safety valve for controlling the flow of fuel gas to a gas powered appliance, though not limited to such use.

Safety valves which are typically used for controlling the supply of fuel gas to a gas powered appliance, for example, a gas powered heater, a gas powered oven, a gas powered hob or the like, typically comprise a solenoid type operated valve. Such valves comprise a valve housing which define a hollow interior valve chamber. An inlet port is provided to the valve chamber, while an outlet port is provided from the valve chamber. A valve seat is formed within the valve chamber between the inlet and the outlet ports, and defines a communicating passageway between the respective inlet and outlet ports. A valving member located within the valve chamber co-operates with the valve seat for closing the communicating passageway for in turn closing the valve. A solenoid coil co-operable with the valving member when energised urges the valving member out of engagement with the valve seat for opening the communicating passageway for opening the valve. An urging means, typically, a compression spring urges the valving member into engagement with the valve seat when power is removed from the solenoid coil. For safety reasons in general two such solenoid valves are normally located in series in a fuel gas pipeline so that should one of the solenoid valves fail to operate for isolating the gas powered appliance from the fuel gas supply, at least one of the solenoid valves should operate.

In general, the valving member is rigidly secured to a magnetic body of the solenoid coil, so that variation in the intensity of the magnetic field generated by the solenoid coil causes the magnetic body to move and in turn the valving member for opening and closing of the valve. In general, the valving member is spring urged into the closed position, and thus, in order to retain the valve open power must be continuously supplied to the solenoid for so long as it is desired to retain the valve open. Furthermore, the magnetic field generated by the solenoid coil must be of sufficient strength to hold the valving member open against the action of the compression spring which acts to urge the valving member into engagement with the valve seat. This, in general, requires a relatively high current through the solenoid coil which leads to heating of the valve as a result of power dissipation from the solenoid coil which may be as high as 4 watts to 5 watts and in many cases even more. Additionally, such solenoid valves tend to be relatively noisy as the valving member is urged between its open and closed positions.

SUMMARY OF THE INVENTION

Accordingly, it is an object of the present invention to provide a valve, and in particular to a provide a safety valve which is particularly suitable for use for fuel gas which overcomes the problems of known types of valves. Although it is also an object of the present invention to provide a valve for other uses which overcomes the problems of known valves.

The present invention is directed towards providing such a valve.

According to the invention there is provided a valve comprising a valve housing defining a valve chamber, the valve chamber forming an inlet chamber and an outlet chamber, a primary valve seat separating the inlet chamber from the outlet chamber and defining a primary communicating passageway communicating the inlet chamber with the outlet chamber, a primary valving member in the valve chamber co-operating with the primary valve seat for selectively closing the primary communicating passageway for isolating the outlet chamber from the inlet chamber, and a drive means for urging the primary valving member out of engagement with the primary valve seat for opening the primary communicating passageway for communicating the respective inlet and outlet chambers, wherein the drive means is releasably magnetically coupled to the primary valving member for urging the primary valving member out of engagement with the primary valve seat, the drive means and the primary valving member being selectively decoupleable, and a first urging means is provided for urging the primary valving member into engagement with the primary valve seat when the primary valving member is decoupled from the drive means.

In one embodiment of the invention a secondary valve seat is located in the outlet chamber downstream of the primary valve seat, the secondary valve seat dividing the outlet chamber into an upstream chamber and a downstream chamber and defining a secondary communicating passageway communicating the downstream chamber with the upstream chamber, and a secondary valving member is provided in the outlet chamber co-operating with the secondary valve seat for closing the secondary communicating passageway for isolating the downstream chamber from the upstream chamber, the secondary valving member being releasably magnetically coupled with the drive means and being urgeable by the drive means out of engagement with the secondary valve seat for opening the secondary communicating passageway for communicating the downstream chamber with the upstream chamber when the secondary valving member is magnetically coupled to the drive means.

In another embodiment of the invention the secondary valving member is selectively decoupleable from the drive means, and a second urging means is provided for urging the secondary valving member into engagement with the secondary valve seat when the secondary valving member is decoupled from the drive means.

In a further embodiment of the invention the secondary valving member is magnetically coupled to the drive means through the primary valving member.

In one embodiment of the invention the secondary valving member is releasably magnetically coupled to the primary valving member.

In another embodiment of the invention the secondary valving member is selectively decoupleable from the primary valving member. Preferably, the secondary valving member is selectively decoupleable from the primary valving member independently of decoupling of the primary valving member from the drive means.

Preferably, the primary and secondary valving members are sequentially urged out of engagement with the respective primary and secondary valving seats by the drive means when the respective primary and secondary valving members are magnetically coupled to the drive means.

Advantageously, the primary valving member is urged out of engagement with the primary valve seat before the secondary valving member is urged out of engagement with the secondary valve seat. Advantageously, the primary valving member is carried on a main carrier member, and the drive means is co-operable with a first secondary carrier member, the first secondary carrier member forming with the main carrier member a magnetic circuit, and a first magnetic field generating means is provided for selectively generating a magnetic field for selectively coupling the main carrier member and the first secondary carrier member.

In one embodiment of the invention a second secondary carrier member is provided for carrying the secondary valving member, the second secondary carrier member forming a magnetic circuit with the main carrier member for facilitating releasable magnetic coupling of the second secondary carrier member with the main carrier member.

In another embodiment of the invention a second magnetic field generating means is provided for selectively magnetically coupling the second secondary carrier member with the main carrier member independently of the magnetic coupling of the main carrier member with the first secondary carrier member.

Preferably, the second urging means acts between the main carrier member and the second secondary carrier member, and advantageously, the secondary valving member is resiliently mounted to the second secondary carrier member for facilitating relative movement between the second secondary carrier member and the secondary valving member for facilitating disengagement of the primary valving member from the primary valve seat prior to disengagement of the secondary valving member from the secondary valve seat.

Preferably, each magnetic field generating means is an electrically powered magnetic field generating means. Advantageously, an electrically conductive connecting means is provided for connecting each magnetic field generating means to an electrical power supply externally of the valve.

In one embodiment of the invention the respective first and second magnetic field generating means are independently connected to the external power supply by the electrically conductive connecting means.

In another embodiment of the invention the first magnetic field generating means comprises a first electromagnetic coil associated with the main carrier member and the first secondary carrier member.

In a further embodiment of the invention the second magnetic field generating means comprises a second electromagnetic coil associated with the main carrier member and the second secondary carrier member.

Alternatively, the first magnetic field generating means selectively couples the second secondary carrier member with the main carrier member.

Advantageously, the first urging means acts between the valve housing and the main carrier member for urging the primary valving member into engagement with the primary valve seat, and preferably, the first urging means comprises a pair of first compression springs.

In one embodiment of the invention the respective first compression springs are electrically conductive and are electrically mutually insulated for acting as the connecting means for connecting the first magnetic field generating means to the external electrical power supply.

In an alternative embodiment of the invention the respective first compression springs independently connect the respective first and-second magnetic field generating means to the external electrical power supply.

In one embodiment of the invention the first compression springs are concentrically mounted. Preferably, the second urging means comprises a second compression spring.

In one embodiment of the invention the valve chamber is an elongated chamber, and the main carrier member is an elongated member extending longitudinally in the valve chamber through the primary communicating passageway from the inlet chamber to the outlet chamber. Preferably, the valve chamber is of circular transverse cross-section defining a main longitudinally extending central axis, and the main carrier member is located co-axially with the main central axis. In one embodiment of the invention the inlet chamber is of transverse cross-sectional area greater than that of the outlet chamber, and the primary valve seat is formed by a step change in the cross-sectional area of the valve chamber between the outlet chamber and the inlet chamber.

In another embodiment of the invention the transverse cross-sectional area of the upstream chamber is greater than that of the downstream chamber, and the secondary valve seat is formed by a step change in the cross-sectional area of the outlet chamber between the downstream and the upstream chambers.

In one embodiment of the invention the valve housing defines an open mouth to the valve chamber of transverse cross-sectional area sufficient to accommodate the primary and secondary valving members into the valve chamber, and an end cap sealably engageable with the valve housing closes the open mouth.

In another embodiment of the invention the primary valving member extends around the main carrier member. Advantageously, the first and second secondary carrier members are located at respective opposite ends of the main carrier member.

In one embodiment of the invention the drive means comprises a drive motor, and a screw drive transmission between the drive motor and the first secondary carrier member. Preferably, the drive shaft of the drive motor is threaded for engaging a correspondingly threaded bore in the first secondary carrier member for forming the screw drive transmission. Advantageously, the drive motor and the screw drive transmission define a rotational axis which coincides with the main central axis of the valve chamber.

In one embodiment of the invention a keying means keys the first secondary carrier member is keyed in the valve chamber for preventing rotation thereof as the screw drive transmission rotates for urging the first secondary carrier member longitudinally along the main central axis.

In one embodiment of the invention a main outlet port is located in the valve housing communicating with the downstream chamber of the outlet chamber, and advantageously, a secondary outlet port is provided in the valve housing communicating with the upstream chamber of the outlet chamber, and ideally, an inlet port is provided in the valve housing communicating with the inlet chamber.

Ideally, the drive motor is provided by a stepper motor, and preferably, comprises a permanent magnet rotor keyed to the drive transmission, the rotor being located in the valve chamber, and a stator comprising a plurality of electromagnetic stator coils being located radially around the rotor and being sealably isolated from the rotor. Advantageously, the stator coils are located in the end cap.

In one embodiment of the invention the valve is adapted for controlling the flow of a fluid therethrough.

In another embodiment of the invention the valve is adapted for controlling the flow of gas therethrough.

In a further embodiment of the invention the valve is adapted for controlling the flow of fuel gas therethrough.

In a still further embodiment of the invention the secondary outlet port is adapted for connecting to a pilot light jet of a gas powered appliance, and the main outlet port is adapted for connection to a main burner of the gas appliance.

The advantages of the invention are many. A particularly important advantage of the invention is that the valve according to the invention is particularly suitable as a safety valve for use in supplying fuel gas to a gas appliance. In particular the valve according to the invention provides an on/off valve which incorporates a safety feature which facilitates instantaneous isolation of the fuel gas supply to the gas appliance in the event of an emergency. This is due to the fact that the primary and secondary valving members can be selectively decoupled from the drive means for instantaneously urging the primary and secondary valving members into engagement with the primary and secondary valve seats. When a single first magnetic field generating means is provided, the primary and secondary valving members are simultaneously instantaneously decoupled from the drive means when the first magnetic field generating means is powered down, thereby, allowing the primary and secondary valving members to be urged simultaneously into engagement with the corresponding primary and secondary valve seats by the urging means. A further advantage of the invention is achieved when a second magnetic field generating means is provided for magnetically coupling the secondary valving member to the drive means or to the first valving member, and the second magnetic field generating means is independent of the first magnetic field generating means. In which case, the primary and secondary valving members can be independently decoupled from the drive means for selectively closing the respective primary and secondary passageways independently of each other. This aspect of the invention provides a particular advantage when the valve is provided with a main outlet port whereby a fluid supply to the main outlet port is controlled by both the primary and secondary valving means and a fluid supply to the secondary outlet port is controlled by the primary valving means only. In which case, by powering down the second magnetic field generating means only the secondary valving member is decoupled from the drive means for isolating the main outlet port from the fluid supply, while the primary valving member may be retained by the first magnetic field generating means and the drive means for permitting the flow of fluid to the secondary outlet port. Thus, in cases where the valve according to the invention is provided for controlling the supply of fuel gas to a gas powered appliance, if the main outlet port is connected to a main burner of the gas appliance, and the secondary outlet port is connected to a pilot light supply for the main burner, the supply of fuel gas to the main burner can be isolated in the event of an emergency by powering down the second magnetic field generating means, while fuel gas can still be supplied to the pilot light jet through the secondary outlet port.

A further advantage of the invention is that little power is dissipated as heat in the valve, and furthermore, the power requirement of the valve is significantly lower than that which is required by a solenoid operated valve. Furthermore, operation of the valve is relatively silent by comparison to conventional solenoid valves, and the valve is operable for regulating the flow of fluid therethrough without any mechanical hystersis.

BRIEF DESCRITPION OF THE DRAWINGS

Figure 2:
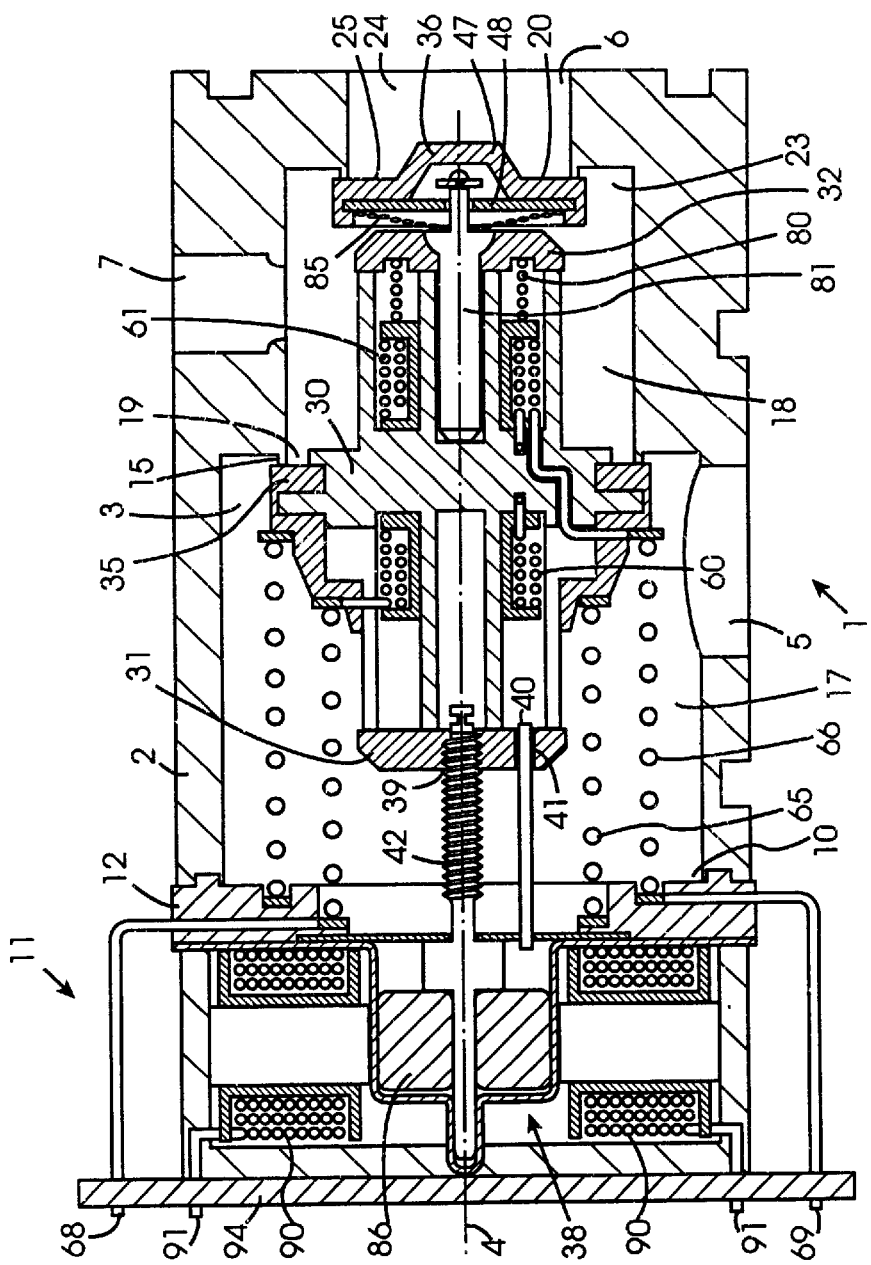
Figure 3:
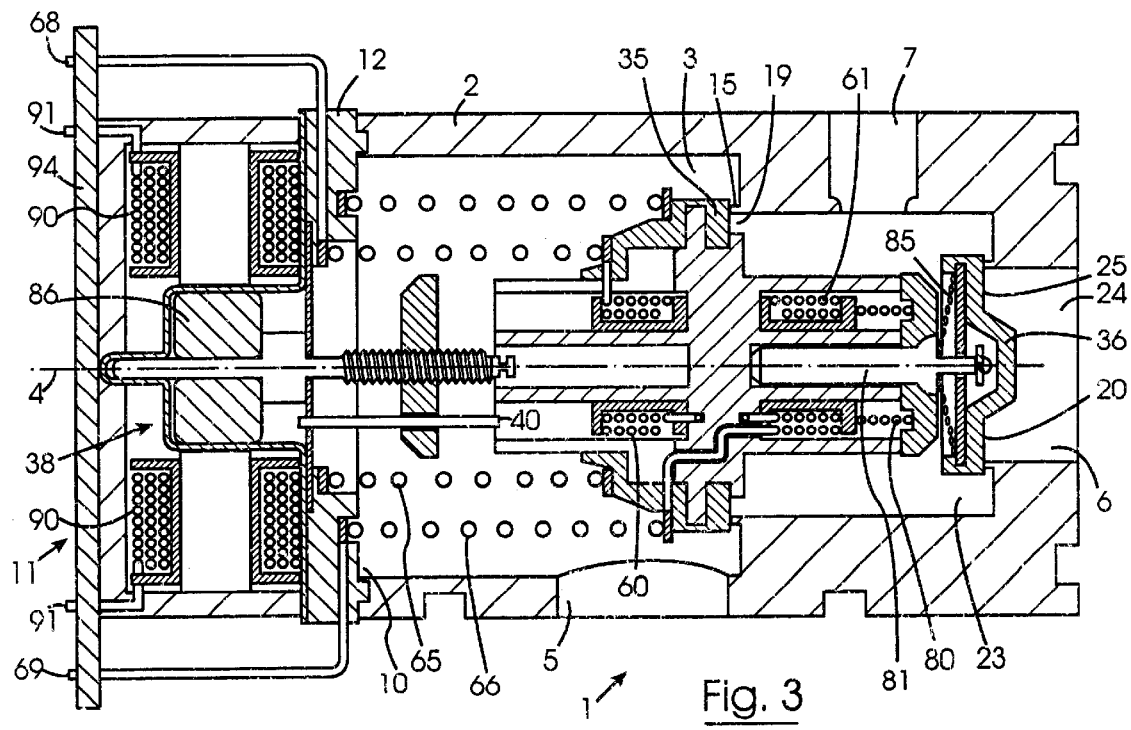
Figure 4:
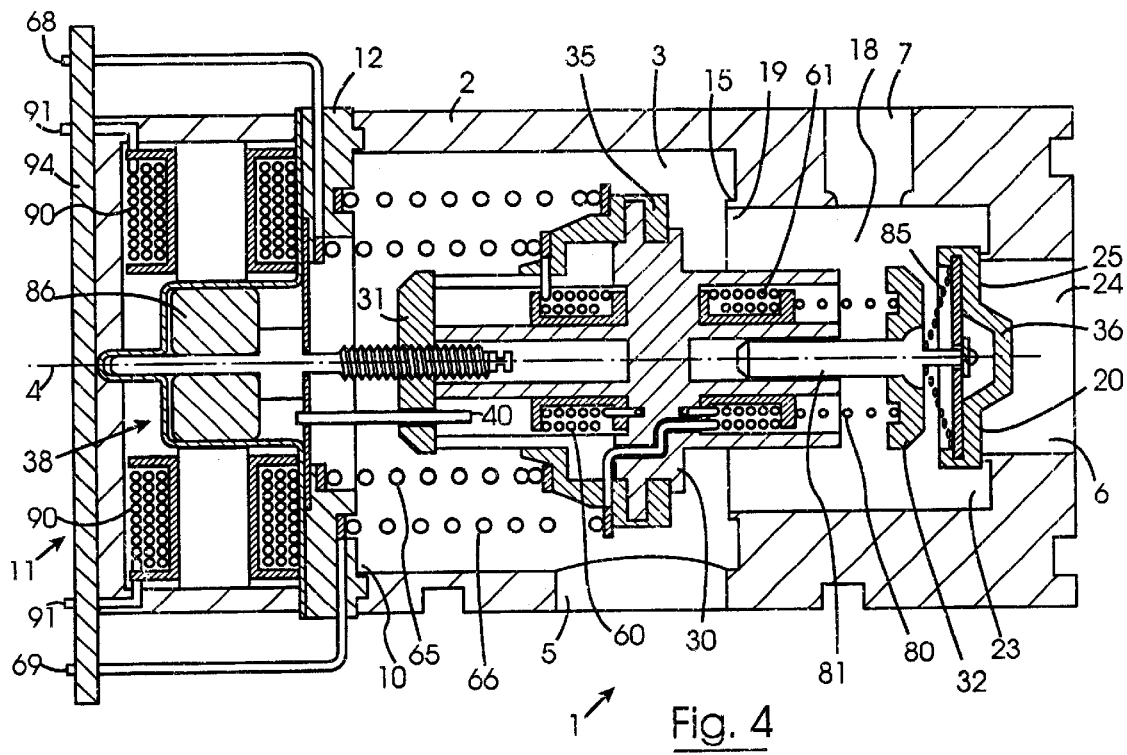
Figure 5:
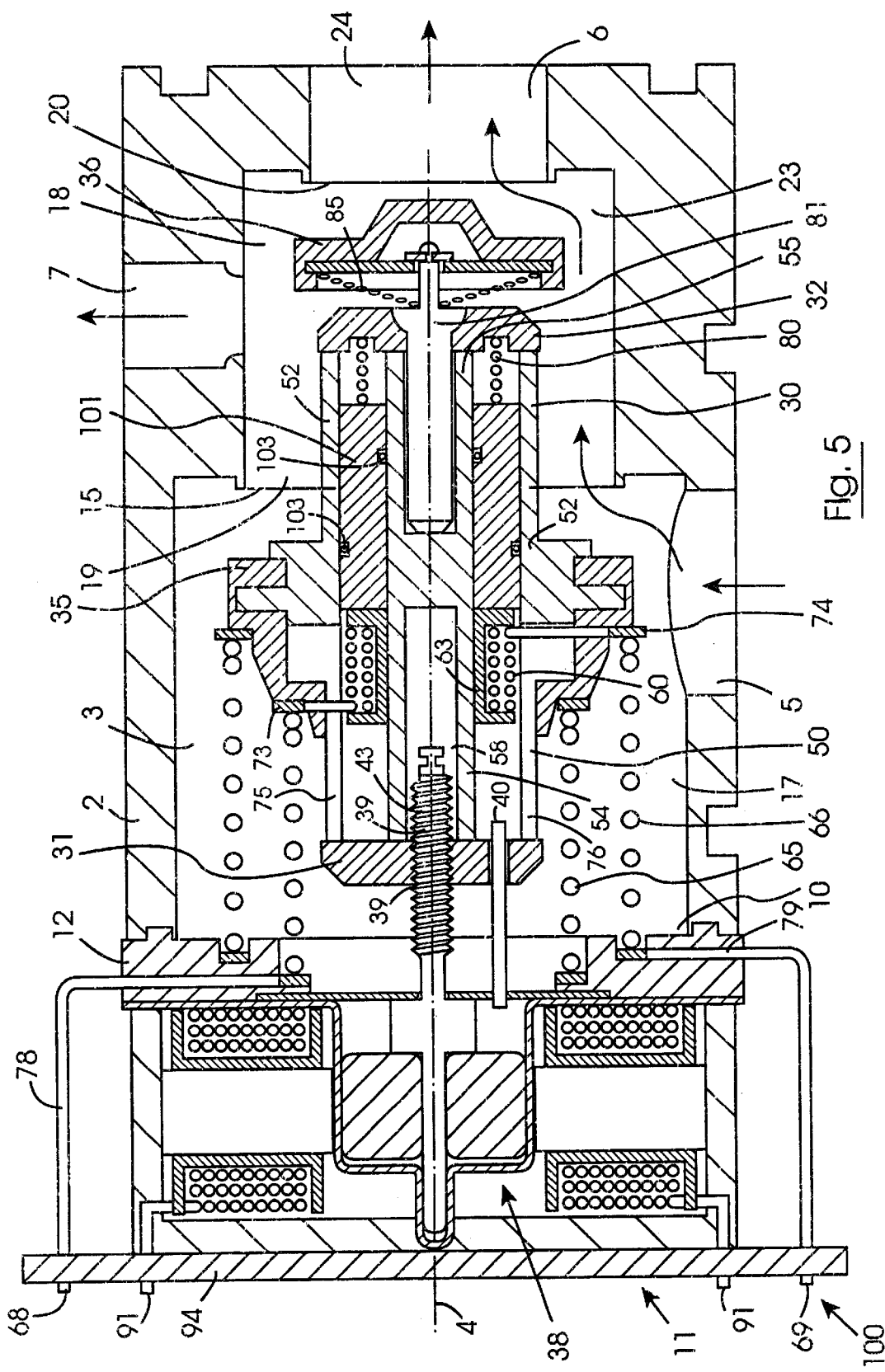
Figure 7:
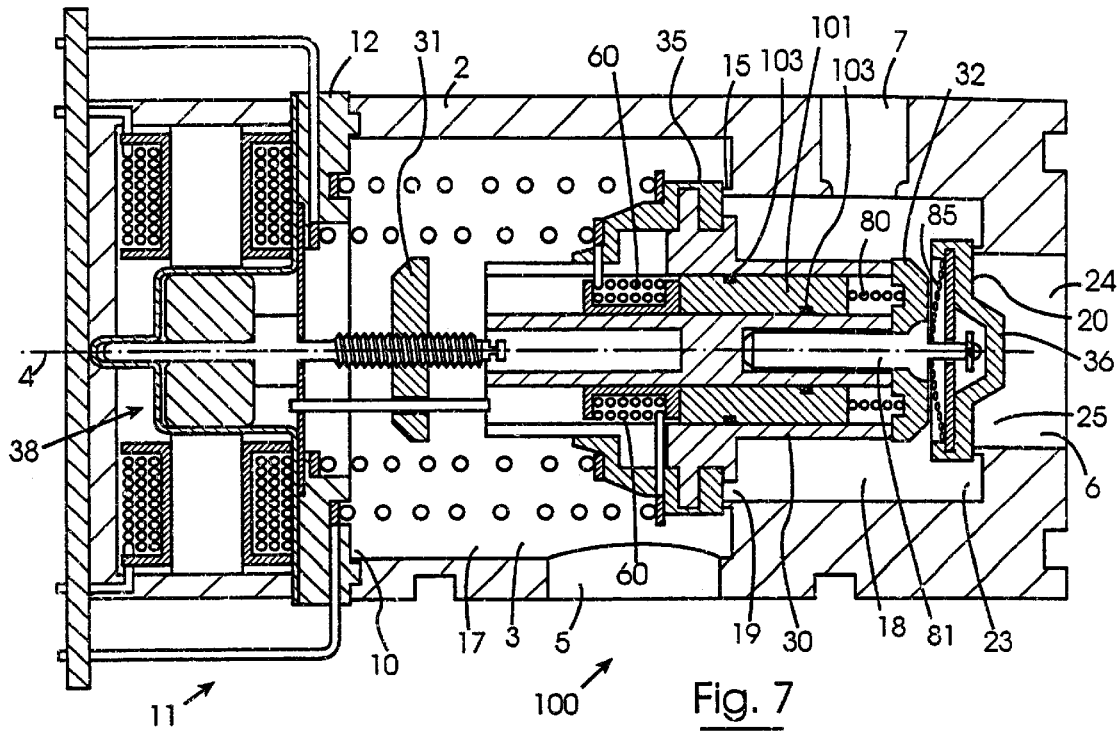
Figure 6:
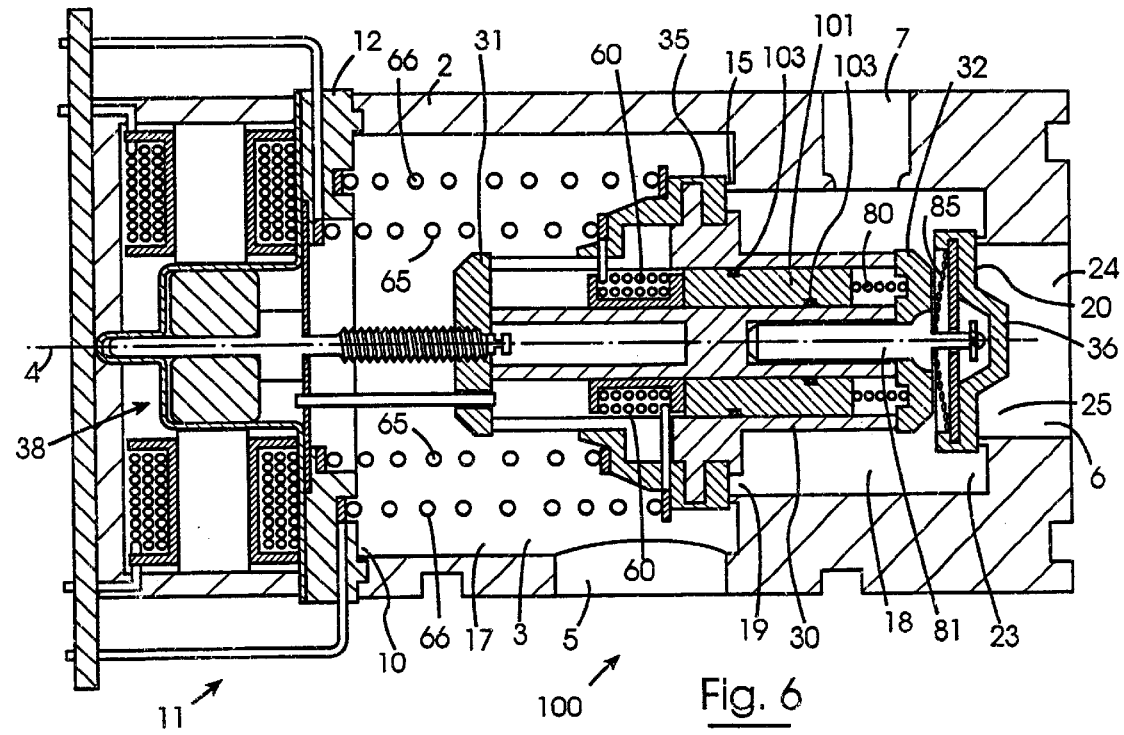

The invention will be more clearly understood from the following description of some preferred embodiments thereof which are given by way of example only with reference to the accompanying drawings, in which:

FIG. 1 is a transverse cross-sectional side elevational view of a valve according to the invention, FIG. 2 is a view similar to FIG. 1 of the valve of FIG. 1 in a different state, FIG. 3 is a view similar to FIG. 1 of the valve of FIG. 1 in another different state, FIG. 4 is a view similar to FIG. 1 of the valve of FIG. 1 in a still further different state, FIG. 5 is a view similar to FIG. 1 of a valve according to another embodiment of the invention, FIG. 6 is a view similar to FIG. 5 of the valve of FIG. 5 in a different state, and FIG. 7 is a view similar to FIG. 5 of the valve of FIG. 5 in another different state.

DETAILED DESCRITPION OF THE INVENTION

Referring to the drawings and initially to FIGS. 1 to 4 thereof, there is illustrated a valve according to the invention indicated generally by the reference numeral 1 which is particularly suitable for switching a fuel gas supply to a gas powered appliance, for example, a gas powered heater, a gas powered oven, a gas powered hob or the like, none of which are illustrated. The valve 1 comprises a valve housing 2 of any suitable material, typically, aluminium which defines an elongated valve chamber 3 of circular stepped transverse cross-sectional area, which defines a main central axis 4. An inlet port 5 to the valve chamber 3 accommodates fuel gas into the valve chamber 3, and a main outlet port 6 and a secondary outlet port 7 accommodate fuel gas from the valve chamber 3. Typically, the main outlet port 6 is adapted for delivering a fuel gas supply to a main burner of the gas powered appliance, while the secondary outlet port 7 is adapted for delivering a pilot supply of fuel gas to a pilot jet of the fuel gas appliance. This is described in more detail below. The valve housing 2 defines an open mouth 10 to the valve chamber 3 which is sealably closed by an end cap 11. A sealing gasket 12 seals the end cap 11 to the valve housing 2.

A primary valve seat 15 is formed in the valve chamber 3 at a step change in the diameter of the valve chamber 3 by an annular lip 16 which extends from the valve housing 2 at the step change in diameter into the valve chamber 3. The primary valve seat 15 divides the valve chamber 3 into the inlet chamber 17 with which the inlet port 5 communicates and an outlet chamber 18 from which the main and secondary outlet ports 6 and 7 extend. The primary valve seat 15 also defines a primary communicating passageway 19 which communicates the inlet chamber 17 with the outlet chamber 18. A secondary valve seat 20 is formed in the outlet chamber 18 by an annular lip 21 which extends from the valve housing 2 into the outlet chamber 18 at another step change in diameter of the valve chamber 3. The secondary valve seat 20 divides the outlet chamber 18 into an upstream chamber 23 from which the secondary outlet port 7 extends, and a downstream chamber 24 from which the main outlet port 6 extends. The secondary valve seat 20 also defines a secondary passageway 25 which communicates the upstream chamber 23 with the downstream chamber 24.

A carrier means comprising a main carrier member 30, and a pair of first and second secondary carrier members 31 and 32, respectively located at opposite ends of the main carrier member 30 are located in the valve chamber 3, and the main carrier member 30 carries a primary valving member 35 for co-operating with the primary valve seat 15 for selectively closing the primary communicating passageway 19 for isolating the main and secondary outlet ports 6 and 7 from the inlet port 5. The second secondary carrier member 32 carries a secondary valving member 36 for cooperating with the secondary valve seat 20 for selectively closing the secondary communicating passageway 25 for isolating the main outlet port 6 from the inlet port 5, and also from the secondary outlet port 7. The main carrier member 30 and the first and second secondary carrier members 31 and 32 are of circular transverse cross-section, and are co-axially located in the valve chamber 3 along the main central axis 4.

A drive means comprising a drive motor 38 located in the end cap 11 as will be described below drives the main carrier member 30 axially in the valve chamber 3 through a screw drive transmission 39, for in turn urging the primary valving member 35 and the secondary valving member 36 out of and into engagement with the primary valve seat 15 and the secondary valve seat 20, respectively, for opening and closing the primary communicating passageway 19 and the secondary communicating passageway 25, respectively. A drive shaft 42 of the drive motor 38 is threaded at 43 and co-operates with a threaded bore 44 extending through the first secondary carrier member 31 for forming the screw drive transmission 39. A keying means comprising a keying pin 40 extends downwardly from the end cap 11 into the valve chamber 3, and slideably engages a corresponding bore 41 in the first secondary carrier member 31 for keying the first secondary carrier member 31 in the valve chamber 3 for preventing rotation of the first secondary carrier member 31 during driving of the first secondary carrier member 31 and the main carrier 30 by the drive motor 38.

The primary valving member 35 is provided by an annular seal 45 which extends around the main carrier member 30, and is carried on a radially extending flange 46 which extends circumferentially around the main carrier member 30. The secondary valving member 36 comprises a sealing disc 47 which is carried on a support disc 48. The support disc 48 is in turn carried on the second secondary carrier member 32 as will be described below.

The main carrier member 30 is machined from a single cylindrical member of magnetic material, typically, steel, and comprises an outer upstream sleeve 50 and an outer downstream sleeve 51 which extend in opposite directions from a central body member 52 from which the flange 46 extends. An upstream core member 54 extends from the central body member 52 within the outer upstream sleeve 50, while a downstream core member 55 extends from the central body member 52 within the outer downstream sleeve 51. An upstream central bore 58 extends into the upstream core member 54, while a downstream central bore 59 extends into the downstream core member 55. The outer upstream and downstream sleeves 50 and 51, the upstream and downstream core members 54 and 55, the upstream and downstream central bores 58 and 59, and the central body member 52 are all co-axial and are coaxial with the main central axis 4 of the valve housing 2. The first and second secondary carrier members 31 and 32 are also of magnetic material, typically, steel, and abut respective ends of the outer upstream and downstream sleeves 50 and 51 and the upstream and downstream core members 54 and 55, respectively, and form with the respective sleeves 50 and 51 and core members 54 and 55 a magnetic circuit.

A first magnetic field generating means comprising a first electromagnetic coil 60 selectively magnetically couples the first secondary carrier member 31 with the main carrier member 30, and a second magnetic field generating means comprising a second electromagnetic coil 61 selectively magnetically couples the second secondary carrier member 32 with the main carrier member 30 so that the primary and secondary valving members 35 and 36 can be urged by the drive motor 38 in the direction of the arrow A for opening the primary and secondary passageways 19 and 25, and in the direction of the arrow B for closing the primary and secondary passageways 19 and 25, respectively. The first and second electromagnetic coils 60 and 61 are located in the main carrier member 30, and are wound on first and second formers 63 and 64, respectively, which extend around the corresponding upstream and downstream core members 54 and 55, respectively, in annuli defined between the corresponding upstream and downstream sleeves 50 and 51 and the upstream and downstream core members 54 and 55, respectively. The first coil 60 induces a magnetic field in the magnetic circuit formed by the main carrier member 30 and the first secondary carrier member 31 for retaining the first secondary carrier member 31 magnetically coupled to the main carrier member 30 while the first coil 60 is electrically powered. The second coil 61 induces a magnetic field in the magnetic circuit formed by the main carrier member 30 and the second secondary carrier member 32 for retaining the second secondary carrier member 32 magnetically coupled to the main carrier member 30 while the second coil 61 is electrically powered.

A first urging means comprising a pair of concentric first compression springs, namely, a first inner compression spring 65 and a first outer compression spring 66 urges the main carrier member 30 axially in the direction of the arrow B for in turn urging the primary and secondary valving members 35 and 36 into engagement with the primary and secondary valve seats 15 and 20, respectively, for closing the primary and secondary communicating passageways 19 and 25, when the first and second coils 60 and 61 are powered down and the first and second secondary carrier members 31 and 32 are magnetically decoupled from the main carrier member 30. The first inner and outer compression springs 65 and 66 are concentric with the main central axis 4, and act between the end cap 11 and the main carrier 30 for urging the primary and secondary valving members 35 and 36 into engagement with the primary and secondary valve seats 15 and 20. The first inner and outer compression springs 65 and 66 are electrically conductive and also act as conducting means for independently connecting the respective first and second coils 60 and 61 to corresponding first and second external terminals 68 and 69 for selectively and independently supplying electrical power to the first and second coils 60 and 61. First and second connectors 78 and 79 extending through the gasket 12 connect the respective first inner and outer compression springs 65 and 66 to the corresponding first and second external terminals 68 and 69, respectively. The gasket 12 is of an electrically insulating material. First and second electrical conductors 73 and 74 extend through corresponding slots 75 and 76 in the main carrier member 30 for electrically connecting the first inner and outer compression springs 65 and 66 to the corresponding first and second coils 60 and 61. The first inner and outer springs 65 and 66 bear on the corresponding first and second connectors 78 and 79 and the corresponding first and second conductors 73 and 74 for providing electrical continuity from the first external terminal 68 to the first coil 60, and from the second external terminal 69 to the second coil 61. The first and second conductors 73 and 74 are insulated relative to the main carrier member 30.

The first and second electromagnetic coils 60 and 61 are electrically connected to the central body member 52 by corresponding first and second conductors 70 and 71. In this way the electrical circuits to the first and second electromagnetic coils 60 and 61 is completed through the central body member 52, and in turn through the main carrier member 30, the first secondary carrier member 31, the drive shaft 42 of the motor 38 and the end cap 11. Thus, the end cap 11, the drive shaft 42, the first secondary carrier member 31 and the main carrier member 30 act as a ground or earth for the respective first and second coils 60 and 61. Accordingly, the first and second electromagnetic coils 60 and 61 can be selectively powered down independently of each other for facilitating selective magnetic decoupling of the second secondary carrier member 32 from the main carrier member 30 and the main carrier member 30 from the first secondary carrier member 31, respectively, for in turn selectively and independently urging the secondary valving member 36 into engagement with the secondary valve seat 20, and the primary valving member 35 into engagement with the primary valve seat 15.

A second urging means comprising a second compression spring 80 acting between the former 64 in the main carrier member 30 and the second secondary carrier member 32 urges the second secondary carrier member 32 from the main carrier 30, for in turn urging the secondary valving member 36 into engagement with the secondary valve seat 20 when the second electromagnetic coil 61 has been powered down and the second secondary carrier member 32 has been magnetically decoupled from the main carrier member 30.

The support disc 48 which supports the sealing disc 47 of the secondary valving member 36 is carried on a spindle 81 which extends through a bore 84 in the second secondary carrier member 32 into the downstream central bore 59 of the main carrier member 30. The spindle 81 is slideable in the bore 84 and in the downstream central bore 59, and is retained in the downstream central bore 59 in the main carrier 30 by the magnetic field in the main carrier member 30 and the second secondary carrier member 32 while the second electromagnetic coil 61 is powered up. The support disc 48 is also slideable on the spindle 81, and a secondary compression spring 85 acting between the second secondary carrier member 32 and the support disc 48 urges the support disc 48 towards the free end of the spindle 81 for, in turn, resiliently urging the secondary valving member 36 relative to the second secondary carrier member 32 into engagement with the secondary valve seat 20.

Turning now to the drive motor 38, the drive motor 38 is a stepper motor and comprises a permanent magnet rotor 86 rigidly secured to the drive shaft 42. The drive shaft 42 is rotatably carried in bearings at 87 and 88 in a shaped portion 89 of the end cap 11. Four radially extending stator coils 90 arranged at 90° intervals around the rotor 86 are located externally of the shaped portion 89 in the end cap 11 for rotating the rotor 86, and in turn the drive shaft 42. Terminals 91 extending from the end cap 11 are connected to the stator coils 90 for powering the stator coils 90. The end cap 11 is so arranged that a chamber 92 in the shaped portion 89 within which the rotor 86 is located is completely sealed from the stator coils 89, and accordingly, gas passing through the bearing at 88 from the valve chamber 3 is sealably retained in the chamber 92. The upstream central bore 58 in the main body member 30 accommodates the threaded portion 43 of the drive shaft 42 as the first and second secondary carrier member 31 and 32 and the main carrier member 30 when magnetically coupled are being urged in the direction of the arrow A by the drive motor 38 for opening the respective primary and secondary communicating passageways 19 and 25. The annulus formed between the upstream outer sleeve 50 and the upstream core member 54 similarly accommodates the keying pin 40 as the first and second secondary carrier member 31 and 32 and the main carrier member 30 are being urged in the direction of the arrow A. An electrically insulating disc 94 in the end cap 11 spaces apart and electrically insulates the first and second terminals 68 and 69 and the terminals 91 of the stator coils from each other.

The operation of the valve 1 will now be described. Typically, where the valve 1 is provided for supplying fuel gas to a gas powered appliance, the main outlet port 6 is connected to a burner of the gas powered appliance, while the secondary outlet port 7 is connected to a pilot jet associated with the burner of the gas powered appliance. A fuel gas supply is connected to the inlet port 5. An electrical power supply is connected to the terminals 68, 69 and 91. The power supply to the terminals 68 and 69 to the first and second electromagnetic coils 60 and 61, respectively, typically is supplied through respective corresponding switches (not shown), which may, for example, be operated under the control of respective thermostats (also not shown) for monitoring the temperature of the gas powered appliance. The power supply to the terminals 91 of the stator coils 90 is typically supplied through a control switch (not shown) for operating the stepper motor 38 for opening and closing the primary and secondary passageways 19 and 25 by respectively disengaging and engaging the primary and secondary valving members 35 and 36 with the primary and secondary valve seats 15 and 20, respectively, and also for modulating the flow of fuel gas through the primary and secondary passageways 19 and 25.

In normal operation the first and second electromagnetic coils 60 and 61 are powered up, thereby magnetically coupling the first and second secondary carrier members 31 and 32 with the main carrier member 30. Accordingly, in normal operation when the valve is closed with the primary and secondary valving members 35 and 36 engaged with the primary and secondary valve seats 15 and 20, the main and secondary outlet ports 6 and 7 are isolated from the main inlet port 5, see FIG. 1. When the valve 1 is in this state and when the first and secondary coils 60 and 61 are powered up, thereby magnetically coupling the first and second secondary carrier members 31 and 32 with the main carrier 30, when it is desired to open the valve to communicate the main and secondary outlet ports 6 and 7 with the inlet port 5, the stepper motor 38 is operated for urging the main carrier member 30 in the direction of the arrow A for in turn disengaging the primary valving member 35 and the secondary valving member 36 from the primary and secondary valve seats 15 and 20. Because of the secondary compression spring 85 which urges the secondary valving member along the spindle 81 into engagement with the secondary valving seat 20, as the main carrier member 30 is being urged in the direction of the arrow A, the primary valving member 35 disengages the primary valve seat 15, while the secondary valving member 36 remains in engagement with the secondary valve seat 20. The secondary valving member 36 remains in engagement with the secondary valve seat 20 until the secondary valving member 36 has slid along the spindle 81 under the action of the secondary compression spring 85 to the free end thereof. At which stage, further movement of the main carrier member 30 in the direction of the arrow A causes the secondary valving member 36 to disengage the secondary valve seat 20, thereby opening the primary and secondary passageways 19 and 25, and thus the valve 1, see FIG. 2. In this way a supply of fuel gas is supplied through the secondary outlet port 7 to the pilot jet, which can be ignited prior to the fuel gas supply being delivered through the main outlet port 6 to the burner. The stepper motor 38 can then be operated for urging the main carrier member 30 in the direction of the arrow A or B for modulating the flow of fuel gas through the main outlet port 6, depending on the rate at which fuel gas is to be delivered to the burner through the outlet port 6. When it is desired to isolate the burner and the pilot jet from the fuel gas supply, the stepper motor 38 is operated for urging the main carrier member 30 in the direction of the arrow B for in turn engaging the primary and secondary valving members 35 and 36 with the corresponding primary and secondary valve seats 15 and 20, thus closing the valve 1. During this entire operation from the time the valve 1 is opened until it is closed, the first and second coils 60 and 61 were continuously powered.

If during normal operation of the valve 1 while the valve 1 is supplying fuel gas to the burner and the pilot jet through the main and secondary outlet ports 6 and 7, should an emergency arise, for example, should the temperature of the gas powered appliance rise above a safe level, the respective switches (not shown) through which the electrical power supply is supplied to the first and second coils 60 and 61 are switched off under the action of the respective thermostats (not shown), thereby isolating the first and second coils 60 and 61 from the power supply. Once the first and second coils 60 and 61 are powered down, the first and second secondary carrier members 31 and 32 are effectively instantaneously magnetically decoupled from the main carrier member 30. Thus, the secondary valving member 36 is virtually instantaneously urged in the direction of the arrow B into engagement with the secondary valve seat 20 under the action of the second compression spring 80 acting between the main carrier member 30 and the second secondary carrier member 32. Simultaneously the main carrier member 30 is urged in the direction of the arrow B by the first inner and outer springs 65 and 66 for in turn simultaneously urging the primary valving member 35 into engagement with the primary valve seat 15, see FIG. 3. Thus, the fuel gas supply is virtually instantly isolated from the main and secondary outlet ports 6 and 7, and in turn from the burner and pilot jet of the gas powered appliance being supplied by the valve 1.

Should the valve 1 be closed in an emergency as just described, in order to open the valve 1, and to operate the valve 1 normally, the stepper motor 38 must first be operated for urging the first secondary carrier member 31 in the direction of the arrow B for engaging the main carrier member 30, and further, for urging the main carrier member 30 into engagement with the second secondary carrier member 32. When the first and second secondary carrier members 31 and 32 are in tight abutting engagement with the main carrier member 30 the power supply to the first and second coils 60 and 61 is again established, thereby magnetically coupling the first and second secondary carrier members 31 and 32 with the main carrier member 30. For so long as the first and second coils 60 and 61 continue to be powered, the main body member 30, and in turn the primary and secondary valving members 35 and 36 can be operated in the directions of the arrows A and B by the stepper motor 38 for opening and closing the valve 1 and for modulating the flow of fuel gas through the valve 1.

In certain cases, should it be desired to only isolate the main outlet port 6 from the inlet port 5 in an emergency, the switch (not shown) supplying the second coil 61 can be switched off, thereby isolating the second coil 61 from the power supply, and thus magnetically decoupling only the second secondary carrier member 32 from the main carrier member 30. This, thus, causes the secondary valving member 36 to be urged in the direction of the arrow B into engagement with the secondary valve seat 20 under the action of the second compression spring 80 acting between the main carrier member 30 and the second secondary carrier member 32, see FIG. 4. In order to operate the valve normally by the stepper motor 38 after the second coil 61 has been isolated from the electrical power supply, the stepper motor 38 is operated for urging the first secondary carrier member 31 and the main carrier member 30 in the direction of the arrow B for urging the main carrier member 30 into engagement with the second secondary carrier member 32 so that by providing the electrical power supply to the second coil 61 the main carrier member 30 and the second secondary carrier member 32 can be again magnetically coupled.

It should be noted that the combined urging force of the first inner and outer compression springs 65 and 66 should be greater than the urging force of the second compression spring 80 for avoiding any danger of the second compression spring 80 acting against the first inner and outer compression springs 65 and 66 for urging the primary valving member 35 out of engagement with the primary valve seat 15 when the valve 1 is closed under the action of the respective compression springs 65, 66 and 80 when the main carrier member 30 is disengaged from the first secondary carrier member 31.

Referring now to FIGS. 5 to 7 there is illustrated a valve 100 according to another embodiment of the invention. The valve 100 is substantially similar to the valve 1, and similar components are identified by the same reference numerals. The main difference between the valve 100 and the valve 1 is that the second electromagnetic coil 61 and the corresponding second former 64 have been dispensed with. However, the magnetic field generated by the first electromagnetic coil 60 is sufficient for retaining the first and second secondary carrier members 31 and 32 magnetically coupled with the main carrier member 30. In order to establish a magnetic circuit for magnetically coupling the first and second secondary carrier members 31 and 32 with the main carrier member 30, the annuli formed between the outer upstream and downstream sleeves 50 and 51 and the upstream and downstream core members 54 and 55 extend continuously through the main carrier member 30 and through the central body member 52. An annular member 101 of non-magnetic material, in this embodiment of the invention brass, extends within the annulus formed between the outer downstream sleeve 51 and the downstream core member 55 for locating the respective outer upstream and downstream sleeves 50 and 51 and the upstream and downstream core members 54 and 55 relative to each other. The annular member 101 extends into the central body member 52. The second compression spring 80 acts between the annular member 101 and the second secondary carrier member 32. O-ring seals 103 seal the annular member 101 within the main carrier member 30 for preventing the flow of fluid from the inlet chamber 17 to the outlet chamber 18 through the main carrier member 30. In this embodiment of the invention the first coil 60 is powered through the first inner and outer compression springs 65 and 66.

Operation of the valve 100 is substantially similar to operation of the valve 1 with the exception that it is not possible to magnetically decouple the second secondary carrier member 32 from the main carrier member 30 independently of decoupling the main carrier member 30 from the first secondary carrier member 31. Once the first electromagnetic coil 60 is powered down, the first and second secondary carrier members 31 and 32 are simultaneously magnetically decoupled from the main carrier member 30.

In FIG. 6 the valve 100 is illustrated with the primary and secondary valving members 35 and 36 engaging the primary and secondary valve seats 15 and 20 thus closing the primary and secondary passageways 19 and 25. In FIG. 6 the main carrier member 30 has been moved into this closed position by the stepper motor 38. In FIG. 7 the main carrier member 30 and the primary and secondary valving members 35 and 36 are illustrated in a similar position to that of FIG. 6, however, in FIG. 7 the main carrier member 30 has been urged into the closed position under the action of the first inner and outer compression springs 65 and 66 as a result of magnetic decoupling of the main carrier member 30 from the first secondary carrier member 31, resulting from powering down of the first coil 60. In FIG. 5 the valve 100 is illustrated open with the main carrier member 30 magnetically coupled to the first secondary carrier member 31 and held in the open position by the stepper motor 38.

The advantage of providing the drive means as a stepper motor 38 is that it permits precision control of axial movement of the main carrier member 30 in the direction of the arrows A and B for in turn providing precision control and modulation of the flow of fuel gas through the main and secondary outlet ports, and in particular, through the main outlet port for modulating the flow of fuel gas supply to the burner. This is achieved by the fact that the number of steps through which the stepper motor 38 is rotated can be counted, thereby allowing a precise determination of the position of the main carrier member 30 in the valve chamber 3, and in turn, the positions of the primary and secondary valving members 35 and 36 relative to the corresponding primary and secondary valve seats 15 and 20 at any time during operation of the valves according to the invention.

A further advantage of the valves according to the invention is that the valves cannot be opened for so long as the electromagnetic coil or coils are powered down, and irrespective of the position of the main carrier member 30 in the valve chamber 5, once the electromagnetic coil or coils are powered down the valve will automatically be closed.

While the valves according to the invention have been described generally as controlling the flow of fuel gas to a gas powered appliance, it will be appreciated that the valves according to the invention may be used for controlling any fluid or fluid like medium.

It will also be appreciated that while the keying means for preventing rotation of the first secondary carrier member within the valve chamber has been described as comprising a keying pin engageable with a corresponding bore in the first secondary carrier member, any other suitable keying means may be provided. For example, it is envisaged that the first secondary carrier member may be appropriately shaped, for example, may be provided with one or more flats which would be engageable with corresponding flats in the housing of the valve.

What is claimed is:

1. A valve comprising a valve housing (2) defining a valve chamber (3), the valve chamber (3) forming an inlet chamber (17) and an outlet chamber (18), a primary valve seat (15) separating the inlet chamber (17) from the outlet chamber (18) and defining a primary communicating passageway (19) communicating the inlet chamber (17) with the outlet chamber (18), a primary valving member (35) in the valve chamber (3) co-operating with the primary valve seat (15) for selectively closing the primary communicating passageway (19) for isolating the outlet chamber (18) from the inlet chamber (17), a secondary valve seat (20) located in the outlet chamber (18) downstream of the primary valve seat (15), the secondary valve seat (20) dividing the outlet chamber (18) into an upstream chamber (23) and a downstream chamber (24) and defining a secondary communicating passageway (25) communicating the downstream chamber (24) with the upstream chamber (23), a secondary valving member (36) being provided in the outlet chamber (18) co-operating with the secondary valve seat (20) for closing the secondary communicating passageway (25) for isolating the downstream chamber (24) from the upstream chamber (23), the secondary valving member (36) being coupled with the primary valving member (35), a drive means (38) releasably magnetically coupleable to the primary valving member (35) for urging the primary valving member (35) and the secondary valving member (36) out of engagement with the primary valve seat (15) and the secondary valve seat (20), respectively, for respectively opening the primary communicating passageway (19) for communicating the respective inlet and outlet chambers (17, 18), and the secondary communicating passageway (25) for communicating the downstream chamber (24) with the upstream chamber (23), the drive means (38) and the primary valving member (35) being selectively decoupleable, and a first urging means (65, 66) being provided for urging the primary valving member (35) into engagement with the primary valve seat (15) and the secondary valving member (36) into engagement with the secondary valve seat (20) when the primary valving member (35) is decoupled from the drive means (38), wherein the secondary valving member (36) is releasably magnetically coupleable to the primary valving member (35), and a second urging means (80) is provided for urging the secondary valving member (36) into engagement with the secondary valve seat (20) when the secondary valving member (36) is decoupled from the primary valving member (35).

2. A valve as claimed in claim 1 in which the secondary valving member (36) is selectively decoupleable from the primary valving member (35).

3. A valve as claimed in claim 1 characterised in which the secondary valving member (36) is selectively decoupleable from the primary valving member (35) independently of decoupling of the primary valving member (35) from the drive means (38).

4. A valve as claimed in claim 1 in which the primary and secondary valving members (35, 36) are sequentially urged out of engagement with the respective primary and secondary valving seats (15, 20) by the drive means (38) when the primary valving member (35) is magnetically coupled to the drive means (38) and the secondary valving member (36) is magnetically coupled to the primary valving member (35).

5. A valve as claimed in claim 4 in which the primary valving member (35) is urged out of engagement with the primary valve seat (15) before the secondary valving member (36) is urged out of engagement with the secondary valve seat (20).

6. A valve as claimed in claim 1 in which the primary valving member (35) is carried on a main carrier member (30), and the drive means (38) is co-operable with a first secondary carrier member (31), the first secondary carrier member (31) forming with the main carrier member (30) a magnetic circuit, and a first magnetic field generating means (60, 61) is provided for selectively generating a magnetic field for selectively coupling the main carrier member (30) and the first secondary carrier member (31), a second secondary carrier member (32) being provided for carrying the secondary valving member (36), the second secondary carrier member (32) forming a magnetic circuit with the main carrier member (30) for facilitating releasable magnetic coupling of the second secondary carrier member (32) with the main carrier member (30).

7. A valve as claimed in claim 6 in which the first and second secondary carrier members (31, 32) are located at respective opposite ends of the main carrier member (30).

8. A valve as claimed in claim 6 in which a second magnetic field generating means (61) is provided for selectively magnetically coupling the second secondary carrier member (32) with the main carrier member (30) independently of the magnetic coupling of the main carrier member (30) with the first secondary carrier member (31).

9. A valve as claimed in claim 6 in which the second urging means (80) acts between the main carrier member (30) and the second secondary carrier member (32).

10. A valve as claimed in claim 6 in which the secondary valving member (36) is resiliently mounted to the second secondary carrier member (32) for facilitating relative movement between the second secondary carrier member (32) and the secondary valving member (36) for facilitating disengagement of the primary valving member (35) from the primary valve seat (15) prior to disengagement of the secondary valving member (36) from the secondary valve seat (20).

11. A valve as claimed in claim 6 in which each magnetic field generating means (60, 61) is an electrically powered magnetic field generating means.

12. A valve as claimed in claim 11 in which the first magnetic field generating means (60) comprises a first electromagnetic coil (60) associated with the main carrier member (30) and the first secondary carrier member (31), and the second magnetic field generating means (61) comprises a second electromagnetic coil (61) associated with the main carrier member (30) and the second secondary carrier member (32), the first magnetic field generating means (60) selectively couples the second secondary carrier member (32) with the main carrier member (30).

13. A valve as claimed in claim 6 in which the first urging means (65, 66) acts between the valve housing (2) and the main carrier member (30) for urging the primary valving member (35) into engagement with the primary valve seat (15).

14. A valve as claimed in claim 6 in which the first urging means (65, 66) comprises a pair of first compression springs (65, 66).

15. A valve as claimed in claim 1 in which the second urging means (80) comprises a second compression spring (80).

16. A valve as claimed in claim 6 in which the valve chamber (3) is an elongated chamber, and the main carrier member (30) is an elongated member extending longitudinally in the valve chamber (3) through the primary communicating passageway (19) from the inlet chamber (17) to the outlet chamber (18).

17. A valve as claimed in claim 6 in which the drive means (38) comprises a drive motor (38), and a screw drive transmission (39) between the drive motor (38) and the first secondary carrier member (31), the drive shaft (42) of the drive motor is threaded (43) for engaging a correspondingly threaded bore (44) in the first secondary carrier member (31) for forming the screw drive transmission (39).

18. A valve as claimed in claim 1 in which a main outlet port (6) is located in the valve housing (2) communicating with the downstream chamber (24) of the outlet chamber (18), a secondary outlet port (7) is provided in the valve housing (2) communicating with the upstream chamber (23) of the outlet chamber (18), and an inlet port (5) is provided in the valve housing communicating with the inlet chamber (17).

19. A valve as claimed in claim 1 in which the drive motor is a stepper motor.

20. A valve as claimed in claim 1 in which the valve (1) is adapted for controlling the flow of a fluid therethrough.

\* \* \* \* \*